(12) United States Patent
Maeda et al.

(10) Patent No.: US 9,142,124 B2
(45) Date of Patent: Sep. 22, 2015

(54) VEHICLE-MOUNTED COMMUNICATION DEVICE AND NAVIGATION DEVICE EQUIPPED WITH THIS VEHICLE-MOUNTED COMMUNICATION DEVICE, COMMUNICATION DEVICE FOR PEDESTRIANS AND NAVIGATION DEVICE EQUIPPED WITH THIS COMMUNICATION DEVICE FOR PEDESTRIANS, AND PEDESTRIAN-TO-VEHICLE COMMUNICATION SYSTEM

(75) Inventors: Takashi Maeda, Tokyo (JP); Yuji Igarashi, Tokyo (JP); Yuji Hamada, Tokyo (JP); Hisashi Sugawara, Tokyo (JP); Takatoshi Tosa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 36 days.

(21) Appl. No.: 14/238,692

(22) PCT Filed: Nov. 29, 2011

(86) PCT No.: PCT/JP2011/006645
§ 371 (c)(1),
(2), (4) Date: Feb. 12, 2014

(87) PCT Pub. No.: WO2013/080249
PCT Pub. Date: Jun. 6, 2013

(65) Prior Publication Data
US 2014/0191884 A1 Jul. 10, 2014

(51) Int. Cl.
*G08G 1/16* (2006.01)
*G08G 1/005* (2006.01)
(Continued)

(52) U.S. Cl.
CPC ............... *G08G 1/005* (2013.01); *G08G 1/163* (2013.01); *G08G 1/166* (2013.01); *H04L 67/12* (2013.01); *H04W 4/046* (2013.01); *H04W 84/18* (2013.01)

(58) Field of Classification Search
CPC ......... G08G 1/005; G08G 1/16; G08G 1/168; G08G 1/166; G08G 1/163; G06G 7/78; B60Q 9/008; H04L 67/12; H04W 4/046; H04W 84/18
USPC .......... 340/435, 436, 903, 904, 944; 701/300, 701/301
See application file for complete search history.

(56) References Cited

U.S. PATENT DOCUMENTS 6,472,978 B1 * 10/2002 Takagi et al. ................. 340/435
7,095,336 B2 * 8/2006 Rodgers et al. ............... 340/903
(Continued)

FOREIGN PATENT DOCUMENTS

JP 2004-220143 A 8/2004
JP 2007-87136 A 4/2007
(Continued)

*Primary Examiner* — Daniel Wu
(74) *Attorney, Agent, or Firm* — Birch Stewart Kolasch & Birch, LLP

(57) ABSTRACT

Disclosed is a vehicle-mounted communication device that carries out radio communications with a communication device for pedestrians which is carried by a pedestrian, the vehicle-mounted communication device including: a receiver that receives pedestrian information showing whether the pedestrian belongs to a pedestrian group formed of the pedestrian and a plurality of pedestrians in the vicinity of the pedestrian from the communication device for pedestrians; a controller that judges the pedestrian information received by the receiver and issues a command to present pedestrian attention information when the pedestrian information shows that the pedestrian does not belong to a pedestrian group; and an information outputter that presents the pedestrian attention information according to the command from the controller. Therefore, the vehicle-mounted communication device enables the driver to certainly recognize the existence of a pedestrian not belonging to a pedestrian group.

19 Claims, 7 Drawing Sheets

(51) Int. Cl.
  *H04W 4/04* (2009.01)
  *H04L 29/08* (2006.01)
  *H04W 84/18* (2009.01)

(56) References Cited

U.S. PATENT DOCUMENTS 7,812,740 B2 * 10/2010 Mergen .................. 340/904
2009/0198440 A1   8/2009  Shiraki et al.
2013/0065530 A1 *  3/2013  Gansen et al. ............... 455/41.2
2014/0015660 A1 *  1/2014  Ogusa et al. .................. 340/435

FOREIGN PATENT DOCUMENTS

| JP | 2009-188527 | A  | 8/2009 |
| JP | 2009-252022 | A  | 10/2009 |
| JP | 4424425     | B2 | 3/2010 |
| JP | 2010-122997 | A  | 6/2010 |
| JP | 2011-215988 | A  | 10/2011 |

* cited by examiner

VEHICLE-MOUNTED COMMUNICATION DEVICE AND NAVIGATION DEVICE EQUIPPED WITH THIS VEHICLE-MOUNTED COMMUNICATION DEVICE, COMMUNICATION DEVICE FOR PEDESTRIANS AND NAVIGATION DEVICE EQUIPPED WITH THIS COMMUNICATION DEVICE FOR PEDESTRIANS, AND PEDESTRIAN-TO-VEHICLE COMMUNICATION SYSTEM

FIELD OF THE INVENTION

The present invention relates to a pedestrian-to-vehicle communication system that carries out radio communications between a communication device for pedestrians which is owned by a pedestrian or a navigation device equipped with this communication device for pedestrians and a vehicle-mounted communication device which is mounted in a vehicle or a navigation device equipped with this vehicle-mounted communication device.

BACKGROUND OF THE INVENTION

In recent years, a pedestrian-to-vehicle communication system that carries out radio communications between a communication device for pedestrians which is owned by a pedestrian and a vehicle-mounted communication device mounted in a vehicle, and estimates and judges the risk of collisions, etc. by enabling them to notify their respective positions and information to each other in order to protect the pedestrian from traffic accidents has been researched and developed. A problem arising in such a system is that because a vehicle-mounted communication device mounted in a vehicle and a communication device for pedestrians which a pedestrian carries exchange pieces of information including their respective positions, speeds, directions, etc. between them frequently, when the surrounding area is crowded with vehicles and pedestrians, the communication traffic increases, and hence information does not reach its destinations or reaches its destinations long behind. When no information from pedestrians reaches the vehicle, the vehicle-mounted communication device cannot determine the possibility of collisions between pedestrians and the vehicle, and this may lead to a traffic accident.

Although no prior art documents about a pedestrian-to-vehicle communication system that deals with such a problem have been found, prior art documents relating to a vehicle-to-vehicle communication system that communicates between vehicles have been found. For example, patent reference 1 discloses a vehicle-to-vehicle communication system that recognizes vehicles which carry their respective vehicle-to-vehicle communication devices and which are travelling toward an identical intersection to form a vehicle group, and that by shortening the length of each of time intervals at which each of the vehicles at the head and tail of the vehicle group transmits data and lengthening the length of each of time intervals at which each of the other vehicles included in the vehicle group transmits data, can notify the existence of the vehicle group to other vehicles approaching the vehicle group at an early time and prevent the communication traffic from increasing between vehicles which construct the vehicle group.

RELATED ART DOCUMENT

Patent Reference

Patent reference 1: Japanese Unexamined Patent Application Publication No. 2009-188527

SUMMARY OF THE INVENTION

Problems to be Solved by the Invention

However, the application of such a conventional technology as disclosed in patent reference 1 to a pedestrian-to-vehicle communication system causes a phenomenon in which a representative pedestrian in a pedestrian group transmits data more frequently than pedestrians not belonging to the pedestrian group, and hence it becomes difficult for data transmitted by a pedestrian not belonging to the pedestrian group to reach the vehicle-mounted communication device. A problem is therefore that because it is easier for the driver of the vehicle to overlook such a pedestrian not belonging to a pedestrian group compared to pedestrians in the pedestrian group, and this may lead to a traffic accident.

The present invention is made in order to solve the above-mentioned problem, and it is therefore an object of the present invention to provide a vehicle-mounted communication device and a navigation device equipped with this vehicle-mounted communication device, a communication device for pedestrians and a navigation device equipped with this communication device for pedestrians, and a pedestrian-to-vehicle communication system capable of enabling drivers to certainly recognize the existence of a pedestrian not belonging to a pedestrian group.

Means for Solving the Problem

In order to achieve the above-mentioned object, in accordance with the present invention, there is provided a vehicle-mounted communication device that carries out radio communications with a communication device for pedestrians which is carried by a pedestrian, the vehicle-mounted communication device including: a receiver that receives pedestrian information showing whether the above-mentioned pedestrian belongs to a pedestrian group formed of the above-mentioned pedestrian and a plurality of pedestrians in the vicinity of the above-mentioned pedestrian from the above-mentioned communication device for pedestrians; a controller that judges the above-mentioned pedestrian information received by the above-mentioned receiver, and issues a command to present pedestrian attention information and also issues a command to transmit vehicle approach information showing that the above-mentioned vehicle is approaching when the above-mentioned pedestrian information shows that the above-mentioned pedestrian does not belong to a pedestrian group; an information outputter that presents the above-mentioned pedestrian attention information according to the command from the above-mentioned controller; and a transmitter that transmits the above-mentioned vehicle approach information to a communication device for pedestrians carried by a pedestrian not belonging to the above-mentioned pedestrian group according to the command from the above-mentioned controller.

Advantages of the Invention

According to the vehicle-mounted communication device and a navigation device equipped with this vehicle-mounted communication device, the communication device for pedestrians and a navigation device equipped with this communication device for pedestrians, and a pedestrian-to-vehicle communication system in accordance with the present invention, drivers are enabled to certainly recognize the existence of pedestrians not belonging to a pedestrian group.

EMBODIMENTS OF THE INVENTION

Hereafter, the preferred embodiments of the present invention will be explained in detail with reference to drawings.
Embodiment 1

Figure 1:
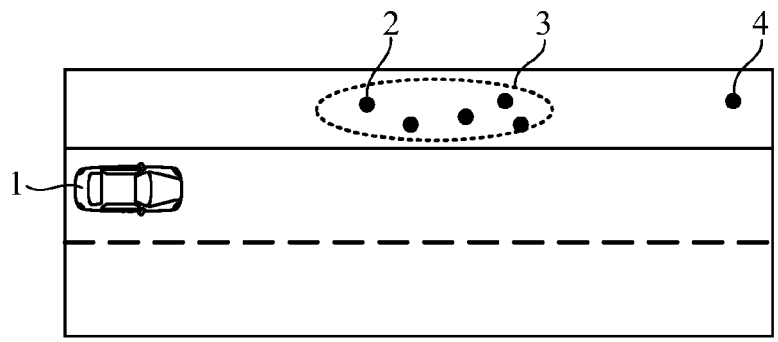
FIG. 1 is a diagram showing an example of a pedestrian-to-vehicle communication system in accordance with Embodiment 1.

FIG. 1 is a diagram showing an example of a pedestrian-to-vehicle communication system in accordance with Embodiment 1 of the present invention. In the example shown in this figure, a vehicle 1 is travelling along a driveway, and a pedestrian 2 belongs to a pedestrian group 3 formed of the pedestrian 2 and a plurality of pedestrians in the vicinity of the pedestrian 2. A pedestrian 4 does not belong to the pedestrian group 3. A vehicle-mounted communication device is mounted in the vehicle 1, and the pedestrian 2, pedestrians 2 belonging to the pedestrian group 3, and the pedestrian 4 not belonging to the pedestrian group 3 have respective communication devices for pedestrians. These communication devices are not shown in FIG. 1. The vehicle-mounted communication device and the communication devices for pedestrians can periodically carry out data transmission of pieces of information including their respective positions and traveling directions via radio communications while receiving transmission data from other terminals. As a result, the pedestrian-to-vehicle communication system can determine the degree of risk of a collision between a vehicle and a pedestrian, etc., and can provide the drivers of vehicles or pedestrians with information such as information calling for attention. To data which each of devices including vehicle-mounted communication devices and communication devices for pedestrians transmits and receives, an ID specific to each of the devices, such as a MAC Address or an IP address, is added, so that each of the devices can be identified.

Figure 2:
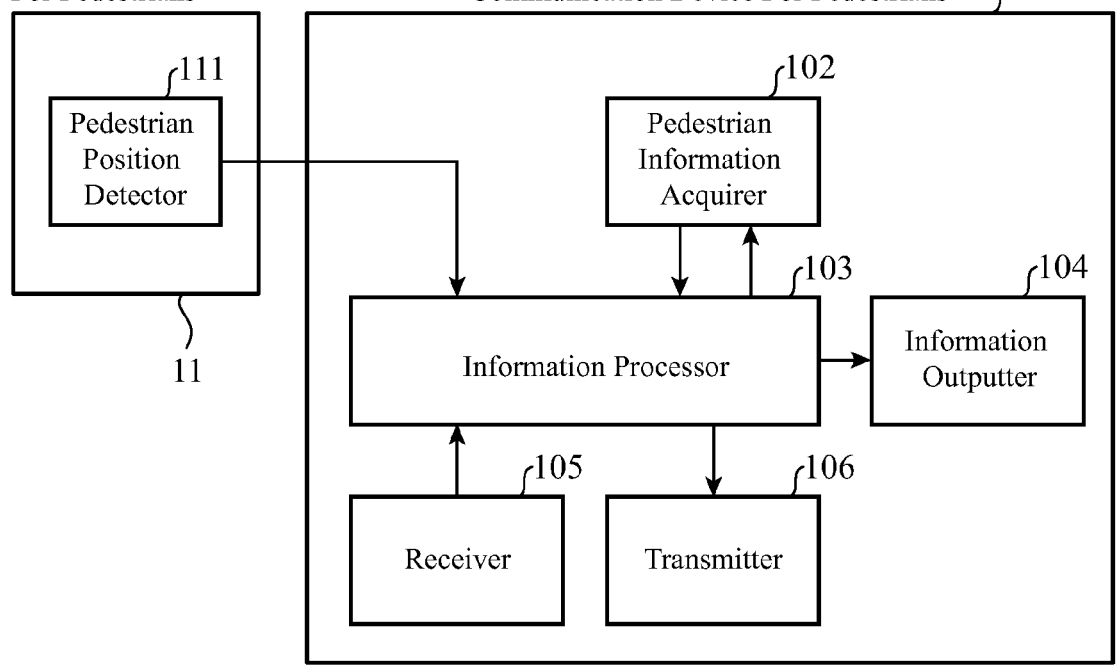
FIG. 2 is a block diagram showing the structure of a communication device for pedestrians.

FIG. 2 is a block diagram showing the structure of a communication device for pedestrians which each pedestrian carries. The communication device for pedestrians 10 includes a pedestrian information acquirer 102, an information processor 103, an information outputter 104, a receiver 105, and a transmitter 106. Further, a navigation device 11 for pedestrians is provided with a pedestrian position detector 111, and this pedestrian position detector detects the pedestrian's current position information by using GPS (Global Positioning System) etc., and sends the current position information to the information processor 103 of the communication device for pedestrians 10. The pedestrian information acquirer 102 acquires information showing whether the communication device for pedestrians 10 and the pedestrian carrying this device form a pedestrian group together with other pedestrians in the vicinity of the pedestrian. The information processor 103 can change and refer to this pedestrian information. The information outputter 104 is provided with, for example, a speaker and LEDs or a liquid crystal display (display screen), and presents information to the pedestrian carrying the communication device for pedestrians 10 in response to a request from the information processor 103. The receiver 105 and the transmitter 106 are engaged in processes using radio communications. The receiver 105 receives wireless data from other communication devices for pedestrians and vehicle-mounted communication devices (refer to FIG. 3), and sends the wireless data to the information processor 103. The transmitter 106 transmits data by radio in response to a request from the information processor 103. The information processor 103 also has a function of acquiring information from the pedestrian position detector 111 and the pedestrian information acquirer 102 periodically, generating transmission data, and transmitting this data from the transmitter 106.

Figure 3:
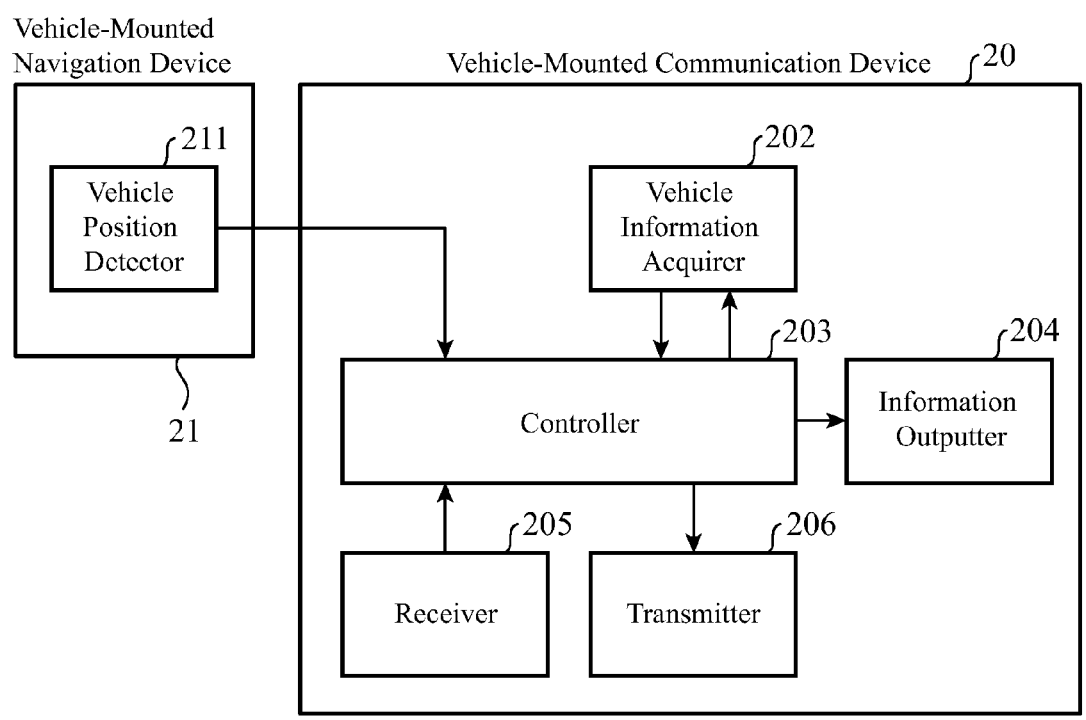
FIG. 3 is a block diagram showing the structure of a vehicle-mounted communication device.

FIG. 3 is a block diagram showing the structure of a vehicle-mounted communication device which is mounted in each vehicle. The vehicle-mounted communication device 20 includes a vehicle information acquirer 202, a controller 203, an information outputter 204, a receiver 205, and a transmitter 206. Further, a vehicle-mounted navigation device 21 is provided with a vehicle position detector 211, detects current position information of the vehicle by using GPS etc., and sends the current position information to the controller 203 of the vehicle-mounted communication device 20. The vehicle information acquirer 202 acquires vehicle information about the vehicle in which the vehicle-mounted communication device 20 is mounted, and sends the vehicle information to the controller 203. The vehicle information is various pieces of information about the vehicle, such as a vehicle speed, acceleration, and a traveling direction. The information outputter 204 is provided with, for example, a speaker and LEDs or a liquid crystal display (display screen), and presents information to the driver of the vehicle in which the vehicle-mounted communication device 20 is mounted in response to a request from the controller 203. The receiver 205 and the transmitter 206 are engaged in processes using radio communications. The receiver 205 receives wireless data from communication devices for pedestrians and other vehicle-mounted communication devices, and sends the wireless data to the controller 203. The transmitter 206 transmits data by radio in response to a request from the controller 203. The controller 203 determines the degree of risk of a collision between the vehicle and a pedestrian, etc. from the descriptions of transmission data from a communication device for pedestrians which is received by the receiver 205, the current position of the vehicle detected by the vehicle position detector 211 of the vehicle-mounted navigation device 21, and the information acquired by the vehicle information acquirer 202 and including the speed and the traveling direction of the vehicle. When determining that there is a risk of collision, the controller provides the driver of the vehicle with information, such as information calling for attention, via the information outputter 204. The controller 203 also has a function of periodically acquiring information from the vehicle position detector 211 and the vehicle information acquirer 202, generating transmission data, and transmitting this data from the transmitter 206.

Figure 4:
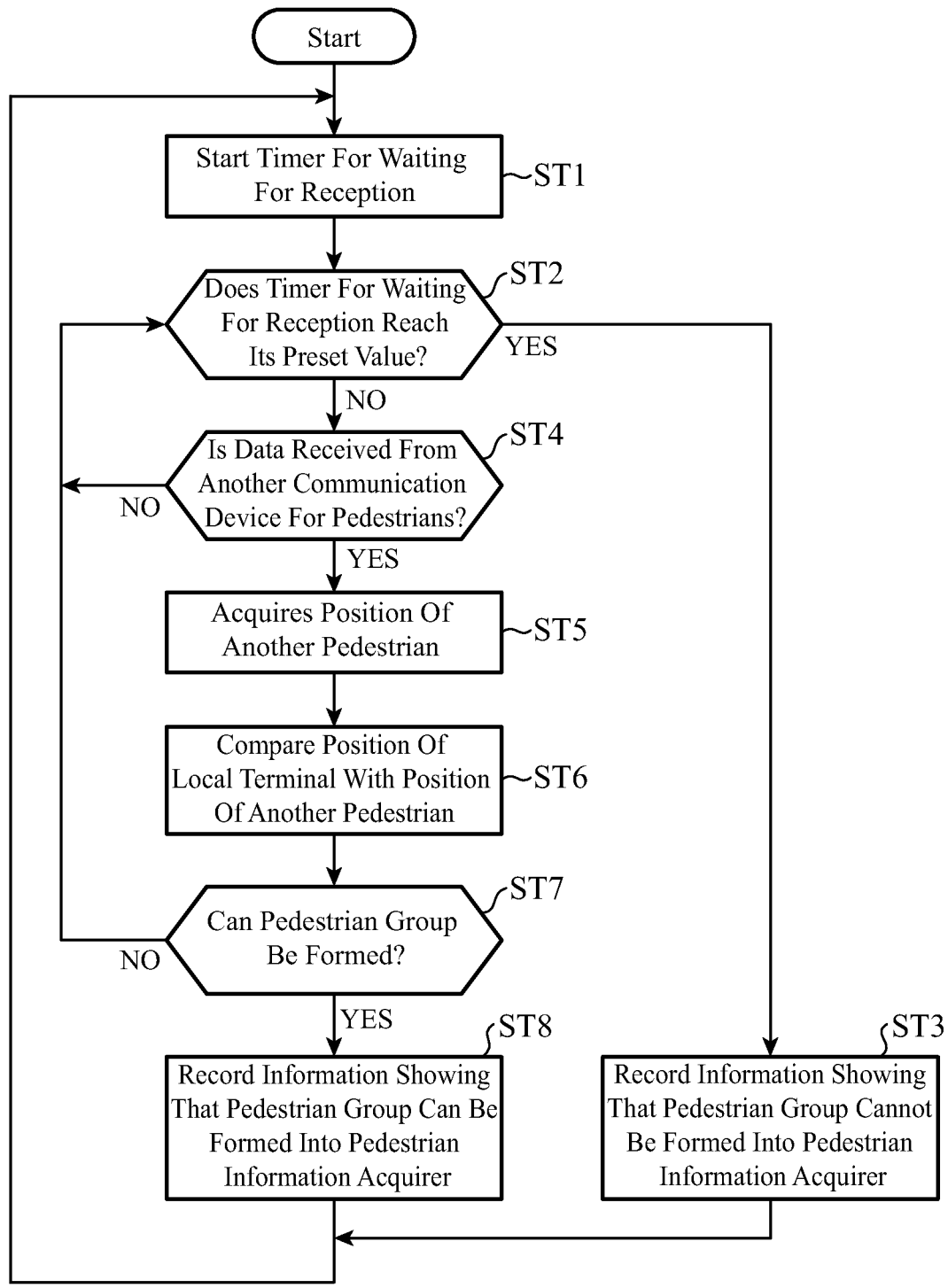
FIG. 4 is a flow chart showing a detecting process of detecting a pedestrian group which is carried out by the communication device for pedestrians.

FIG. 4 is a flow chart showing a detecting process of detecting a pedestrian group which is carried out by the communication device for pedestrians 10. First, the information processor 103 starts a timer for waiting for reception (e.g., sets the timer for 5 seconds) (step ST1), and waits for data reception from another communication device for pedestrians. When the timer started in step ST1 has reached its preset value (the time is up) (when YES in step ST2), the information processor assumes that no communication device for pedestrians with which the communication device for pedestrians 10 can form a pedestrian group exists in the vicinity of the communication device for pedestrians 10, records information showing that itself (the communication device for pedestrians 10 which is the local terminal) does not belong to a pedestrian group, i.e., showing that no pedestrian group is formed into the pedestrian information acquirer 102 as pedestrian information (step ST3), and repeats the process from the start.

In contrast, when receiving data from another communication device for pedestrians (when YES in step ST4) before the timer started in step ST1 has reached its preset value (when NO in step ST2), the information processor acquires the current position of the other pedestrian who is the transmission source from the received data (step ST5). The information processor then compares the position of the other pedestrian which the information processor has acquired with the current position of the communication device for pedestrians 10 which is the local terminal (step ST6), the current position being detectable by the pedestrian position detector 111, to determine whether or not a pedestrian group can be formed (step ST7). The information processor can carry out this determination from distances and a number of communication devices for pedestrians by, for example, determining that a pedestrian group can be formed when five or more other communication devices for pedestrians exist in a predetermined region at a certain distance from itself (the communication device for pedestrians 10 which is the local terminal). When then determining that no pedestrian group can be formed (when NO in step ST7), the information processor returns to step ST2 and waits for data reception again. In contrast, when determining that a pedestrian group can be formed (when YES in step ST7), the information processor records information showing that itself (the communication device for pedestrians 10 which is the local terminal) belongs to the pedestrian group, i.e., showing that the pedestrian group is formed into the pedestrian information acquirer 102 as pedestrian information (step ST8), and repeats the process from the start.

Figure 5:
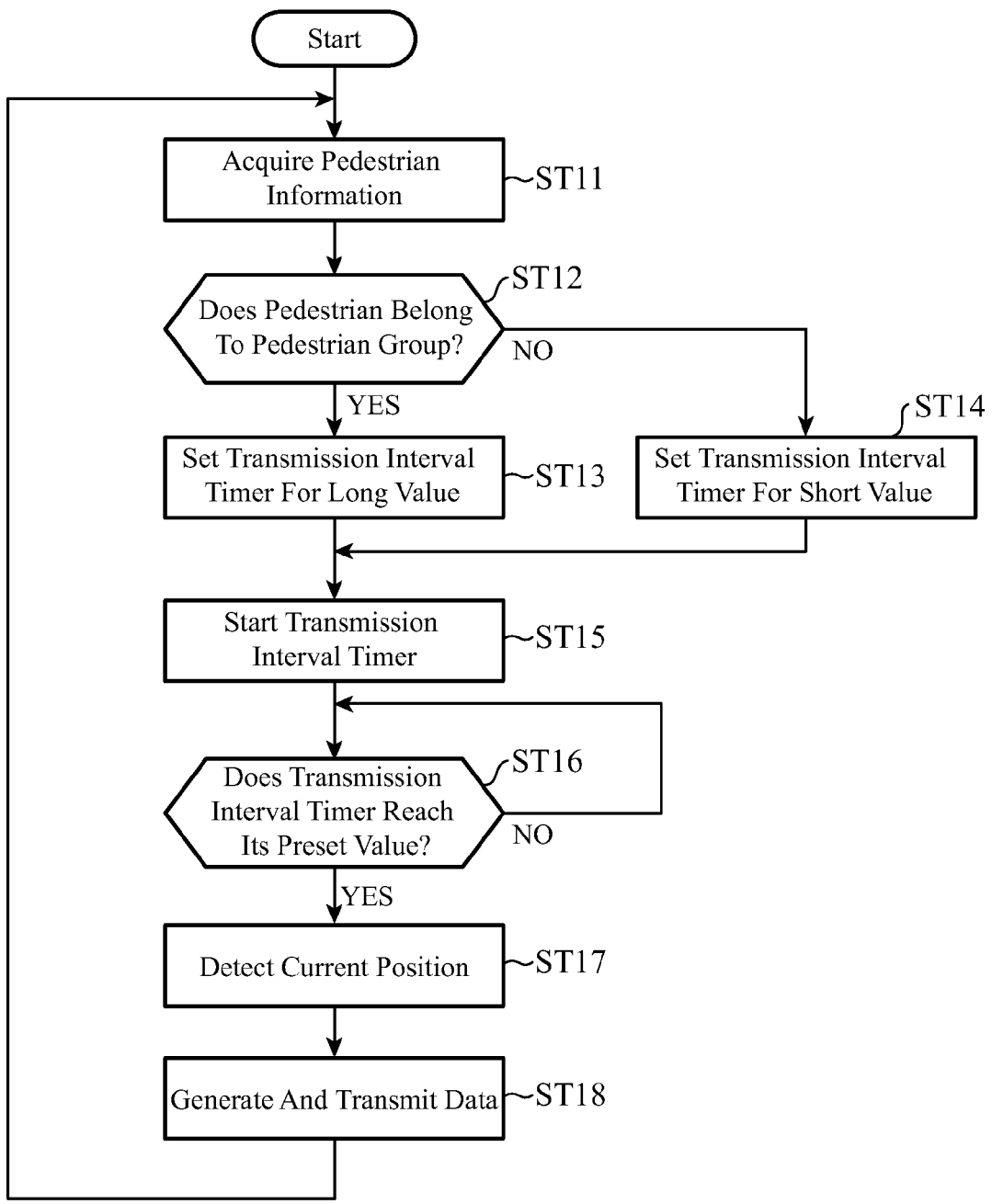
FIG. 5 is a flow chart showing a data transmitting process carried out by the communication device for pedestrians.

FIG. 5 is a flow chart showing a data transmission process carried out by the communication device for pedestrians 10. The communication device for pedestrians acquires the information showing whether itself (the communication device for pedestrians 10 which is the local terminal) belongs to a pedestrian group from the information processor 103 and the pedestrian information acquirer 102 (step ST11). When determining that itself belongs to a pedestrian group from the acquired information (when YES in step ST12), the communication device for pedestrians determines that it is easy for the drivers of vehicles to recognize the owner, and sets a data transmission interval timer for a large value (long value) (step ST13), whereas when determining that itself does not belong to a pedestrian group (when NO in step ST12), the communication device for pedestrians determines that it is easy for the drivers of vehicles to overlook the owner and sets the data transmission interval timer for a small value (short value) in order to have the drivers recognize the owner certainly (step ST14). The communication device for pedestrians then starts the transmission interval timer by using the value set to the timer (step ST15), and waits until the set time has elapsed (step ST16). When the timer has reached its preset value (time is up) (when YES in step ST16), the communication device for pedestrians detects the current position thereof (communication device for pedestrians 10 which is the local terminal) by using the pedestrian position detector 111 (step ST17), uses the acquired position of itself (communication device for pedestrians 10 which is the local terminal) and the information acquired, in step ST11, from the pedestrian information acquirer 102 and showing whether itself (communication device for pedestrians 10 which is the local terminal) belongs to a pedestrian group to generate transmission data, and transmits this transmission data by radio from the transmitter 106 (step ST18). The communication device for pedestrians 10 repeats this series of processes.

Through the above-mentioned processes, the length of each of the data transmission intervals at which the communication device for pedestrians transmits the data when belonging to a pedestrian group is set to a long one while the length of each of the data transmission intervals at which the communication device for pedestrians transmits the data when not belonging to a pedestrian group is set to a short one. As a result, when the communication device for pedestrians does not belong to a pedestrian group the frequency with which the transmission data from the communication device for pedestrians are received by vehicle-mounted communication devices increases, and the vehicle-mounted communication devices can therefore receive, more frequently, the data from the communication device for pedestrians owned by the pedestrian who does not belong to a pedestrian group and who cannot easily come within sight of the drivers, the drivers can be prevented from overlooking the pedestrian.

As an alternative, the communication device for pedestrians can change the transmission power (transmission power) for transmitting the data according to whether the communication device for pedestrians belongs to a pedestrian group, instead of changing the length of each of the transmission intervals (transmission frequency) at which the communication device for pedestrians transmits the data. More specifically, when the communication device for pedestrians belongs to a pedestrian group, the communication device for pedestrians lowers the transmission power; otherwise, raises the transmission power. As a result, the transmission data from the communication device for pedestrians can reach a long distance with the higher transmission power when the pedestrian does not belong to a pedestrian group, so that the data can reach vehicle-mounted communication devices more easily. Further, in a case in which the radio communication method has a priority control function, the communication device for pedestrians can change the priority of the data transmission instead of changing the length of each of the transmission intervals (transmission frequency) at which the communication device for pedestrians transmits the data. More specifically, when the pedestrian belongs to a pedestrian group, the communication device for pedestrians lowers the priority; otherwise, raises the priority. As a result, the transmission data from the communication device for pedestrians can be transmitted on a priority basis when the pedestrian does not belong to a pedestrian group, so that the data can reach vehicle-mounted communication devices more easily.

Figure 6:
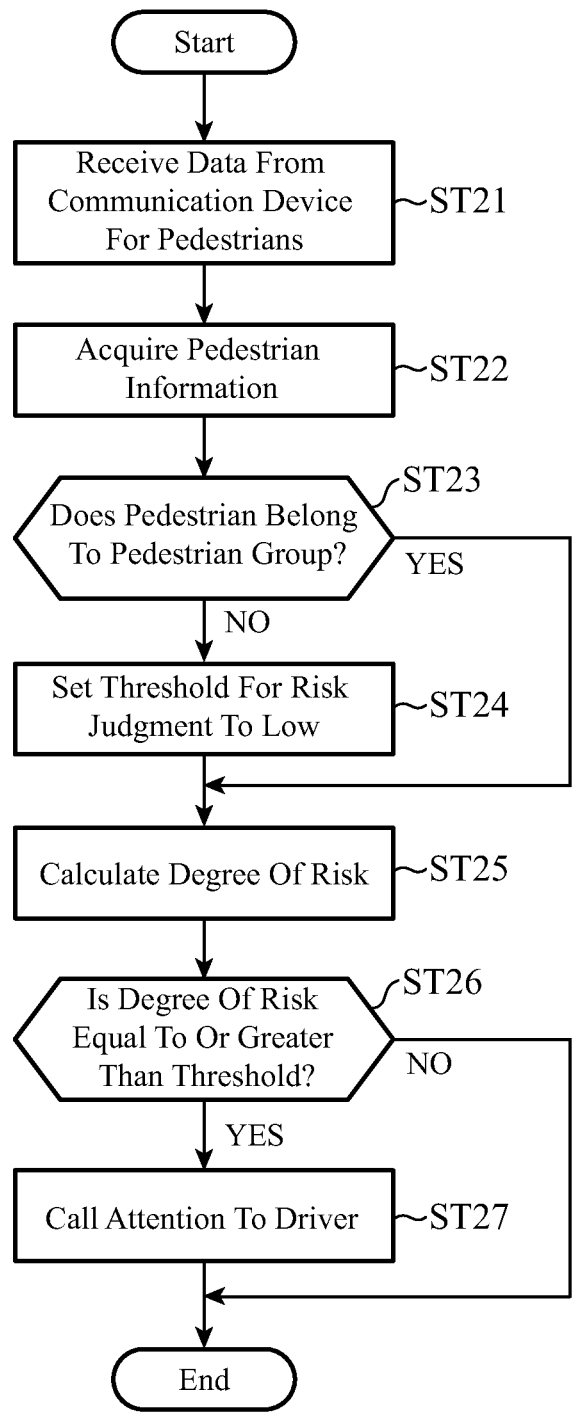
FIG. 6 is a flow chart showing a process of notifying a driver that a pedestrian not belonging to a pedestrian group exists in the vicinity of the vehicle, which is carried out by the vehicle-mounted communication device.

FIG. 6 is a flow chart showing a process of notifying the driver that a pedestrian not belonging to a pedestrian group exists in the vicinity of the vehicle, which is carried out by the vehicle-mounted communication device 20. First, the vehicle-mounted communication device 20 receives data transmitted from a communication device for pedestrians 10 by using the receiver 205 (step ST21). The controller 203 acquires and analyzes the data which the receiver 205 has received, and acquires pedestrian information showing whether the pedestrian carrying the communication device for pedestrians 10 which is the transmission source of the data belongs to a pedestrian group (step ST22). When the pedestrian carrying the communication device for pedestrians which is the transmission source does not belong to a pedestrian group (when NO in step ST23), the controller sets a threshold for risk judgment to be lower than a normal value in order to make it easy for the pedestrian to be determined to have a risk of collision with the vehicle (step ST24). It is assumed that when the pedestrian belongs to a pedestrian group (when YES in step ST23), the controller sets the threshold for risk judgment to be the normal value.

After that, the controller 203 calculates the degree of risk of a collision between the vehicle and the pedestrian from the descriptions of the transmission data from the communication device for pedestrians 10 which is received by the receiver 205, the current position of the vehicle which is detected by the vehicle position detector 211, and the speed, the traveling direction, etc. of the vehicle which are acquired by the vehicle information acquirer 202 (step ST25). In this case, for example, the distance between the vehicle and the pedestrian can be calculated on the basis of the position of the vehicle and the position of the pedestrian, which is received from the communication device for pedestrians 10, and the degree of risk of a collision can be judged and calculated from the distance. As an alternative, the time required for the vehicle to reach the pedestrian can be calculated on the basis of the distance and the vehicle speed, and the degree of risk of a collision can be judged and calculated from the time. More specifically, when the degree of risk of a collision is calculated from, for example, the distance between the vehicle and the pedestrian, the degree of risk of a collision is an index which is judged to be larger, as the degree of risk of a collision, with decrease in the distance, and is judged to be smaller, as the degree of risk of a collision, with increase in the distance. As an alternative, when the degree of risk of a collision is calculated from, for example, the time required for the vehicle to reach the pedestrian, the degree of risk of a collision is an index which is judged to be larger, as the degree of risk of a collision, with decrease in the time, and is judged to be smaller, as the degree of risk of a collision, with increase in the time.

Then, when the degree of risk of a collision which is judged and calculated this way is greater than the preset threshold, i.e., when the distance between the vehicle and the pedestrian is less than the predetermined value in the case in which the degree of risk of a collision is calculated from, for example, the distance, or when the time required for the vehicle to reach the pedestrian is less than the predetermined value in the case in which the degree of risk of a collision is calculated from, for example, the time (when YES in step ST26), the controller issues a command to present pedestrian attention information for calling attention to the driver of the vehicle and provides the pedestrian attention information via the information outputter 204 (step ST27). As a method of calling attention, any method, such as outputting a buzzer sound or the like from a speaker, blinking an LED lamp, or displaying characters, a graphic, or the like on a liquid crystal display (display screen), can be used.

Although the example of, when pedestrian information received from a communication device for pedestrians 10 shows that the pedestrian does not belong to a pedestrian group, further calculating the degree of risk of a collision from, for example, the distance between the pedestrian and the vehicle or the time required for the vehicle to reach the pedestrian is explained in this embodiment, when pedestrian information received from a communication device for pedestrians 10 shows that the pedestrian does not belong to a pedestrian group, the controller 203 can alternatively issue a command to present pedestrian attention information to that effect so as to present the pedestrian attention information for calling attention to the driver of the vehicle via the information outputter 204 (i.e., carries out the process in step ST27 when NO in step ST23). As a result, the vehicle-mounted communication device can have the driver of the vehicle immediately recognize the pedestrian who does not belong to a pedestrian group.

Because the vehicle-mounted communication device can easily have the driver pay attention to the degree of risk of a collision with a pedestrian not belonging to a pedestrian group and carrying a communication device for pedestrians through the above-mentioned processes, the occurrence of a traffic accident due to the driver's oversight of the pedestrian can be prevented.

Figure 7:
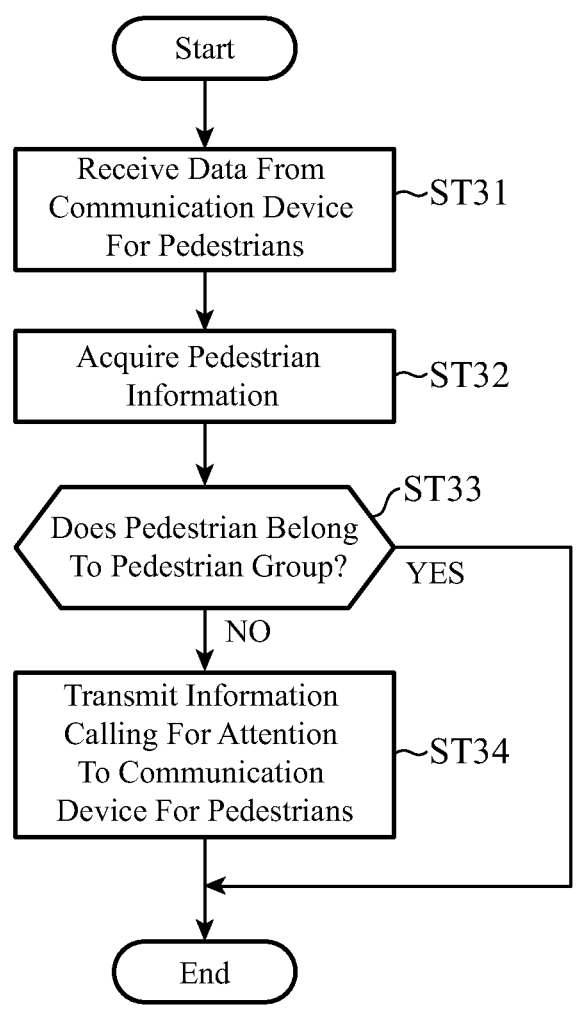
FIG. 7 is a flow chart showing a process of notifying a pedestrian not belonging to a pedestrian group that the vehicle is approaching, which is carried out by the vehicle-mounted communication device.

FIG. 7 is a flow chart showing a process of notifying a pedestrian not belonging to a pedestrian group that the vehicle is approaching, which is carried out by the vehicle-mounted communication device 20. First, the vehicle-mounted communication device 20 receives data transmitted by a communication device for pedestrians 10 by using the receiver 205 (step ST31). The controller 203 acquires and analyzes the data received by the receiver 205, and acquires pedestrian information showing whether the pedestrian carrying the communication device for pedestrians 10 which is the transmission source of the data belongs to a pedestrian group (step ST32). Then, when the pedestrian carrying the communication device for pedestrians 10 which is the transmission source does not belong to a pedestrian group (when NO in step ST33), in order to notify the pedestrian that there is a danger that the vehicle is approaching, the controller 203 issues a command to transmit vehicle approach information showing that the vehicle is approaching only to the above-mentioned communication device for pedestrians 10 to the transmitter 206, and transmits the vehicle approach information via the transmitter 206 (step ST34). As a result, the communication device for pedestrians 10 which has received the vehicle approach information via the receiver 105 outputs the vehicle approach information received thereby from the information outputter 104 (not shown).

Because a pedestrian not belonging to a pedestrian group is thus enabled to notice the existence of the vehicle through the above-mentioned processes, the pedestrian can be urged to pay a spontaneous attention to the vehicle and take evasive action, and therefore the occurrence of a traffic accident can be prevented.

The communication device for pedestrians can be built in any one of various types of portable objects, such as a mobile phone, portable game hardware, a tablet terminal, a laptop PC, or a stick. Further, as the radio communication method, various types of communications including a communication via infrastructure communication devices, such as a radio LAN (Local Area Network), a WAVE (Wireless Access in Vehicular Environments) vehicle-to-vehicle communication, a 700 MHz band vehicle-to-vehicle communication, a 5 GHz band vehicle-to-vehicle communication, or a 5.8 GHz DSRC (Dedicated Short-Range Communication), and a communication using mobile phones via mobile phone base stations can be provided.

As mentioned above, in accordance with this Embodiment 1, because data from a pedestrian belonging to a pedestrian group who can easily come within sight of the drivers of vehicles are transmitted to vehicle-mounted communication devices with a decreased frequency, lowered power, or a lowered priority while data from a pedestrian who cannot easily come within sight of the drivers of vehicles and does not belong to a pedestrian group are transmitted to vehicle-mounted communication devices with an increased frequency, raised power, or a raised priority, the vehicle-mounted communication device can determine that a pedestrian who is easier to be overlooked has a high degree of risk and have the driver pay attention to the pedestrian, and hence can have the driver certainly recognize the existence of a pedestrian not belonging to a pedestrian group. The vehicle-mounted communication device can also have a pedestrian not belonging to a pedestrian group pay attention to the vehicle's approach, thereby being able to urge the pedestrian to pay a spontaneous attention to the vehicle and take evasive action, and therefore preventing the occurrence of a traffic accident.

Embodiment 2

Although the example in which the communication device for pedestrians 10 and the vehicle-mounted communication device 20 are disposed separately from the navigation device 11 for pedestrians and the vehicle-mounted navigation device 21 respectively is explained in Embodiment 1, the communication device for pedestrians and the vehicle-mounted communication device can be integral with the navigation device for pedestrians and the vehicle-mounted navigation device respectively. Therefore, an example in which the communication device for pedestrians 10 and the navigation device 11 for pedestrians are replaced by a navigation device 100 equipped with a communication device for pedestrians and the vehicle-mounted communication device 20 and the vehicle-mounted navigation device 21 are replaced by a navigation device 200 equipped with a vehicle-mounted communication device will be explained in Embodiment 2. The same structural components as those explained in Embodiment 1 are designated by the same reference numerals, and the duplicated explanation of the components will be omitted hereafter.

Figure 8:
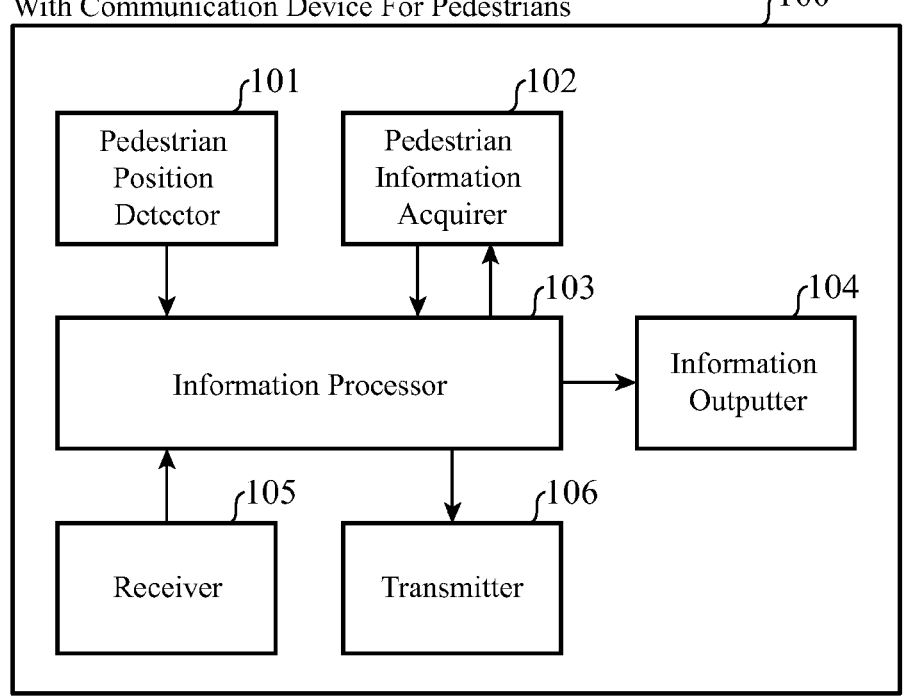
FIG. 8 is a block diagram showing the structure of a navigation device equipped with a communication device for pedestrians.

FIG. 8 is a block diagram showing the structure of the navigation device equipped with the communication device for pedestrians. This navigation device 100 equipped with the communication device for pedestrians includes a pedestrian position detector 101, a pedestrian information acquirer 102, an information processor 103, an information outputter 104, a receiver 105, and a transmitter 106. The pedestrian position detector 101 detects a pedestrian's current position information by GPS etc., and sends the current position information to the information processor 103. The pedestrian information acquirer 102 acquires information showing whether the pedestrian carrying the navigation device 100 forms a pedestrian group with other pedestrians in the vicinity of the pedestrian. The information processor 103 can change and refer to this pedestrian information. The information outputter 104 is provided with, for example, a speaker and LEDs or a liquid crystal display (display screen), and presents information to the pedestrian carrying the navigation device 100 in response to a request from the information processor 103. The receiver 105 and the transmitter 106 are engaged in processes using radio communications. The receiver 105 receives wireless data from other communication devices for pedestrians or other navigation devices each equipped with a communication device for pedestrians and vehicle-mounted communication devices or navigation devices each equipped with a vehicle-mounted communication device, and sends the wireless data to the information processor 103. The transmitter 106 transmits data by radio in response to a request from the information processor 103. The information processor 103 also has a function of acquiring information from the pedestrian position detector 111 and the pedestrian information acquirer 102 periodically, generating transmission data, and transmitting this data from the transmitter 106.

Figure 9:
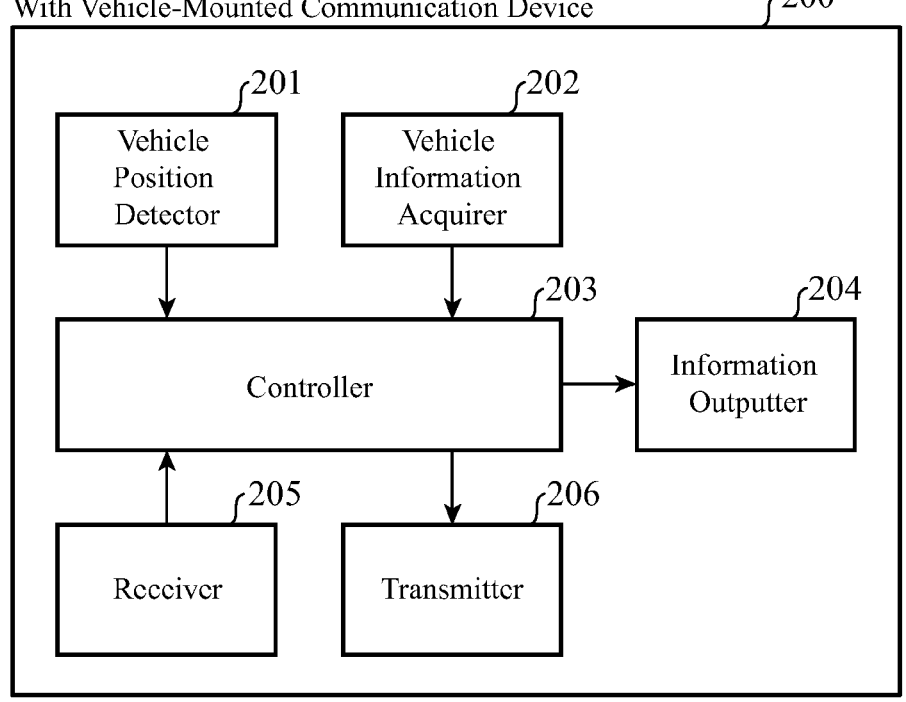
FIG. 9 is a block diagram showing the structure of a navigation device equipped with a vehicle-mounted communication device.

FIG. 9 is a block diagram showing the structure of the navigation device equipped with the vehicle-mounted communication device. This navigation device 200 equipped with the vehicle-mounted communication device includes a vehicle position detector 201, a vehicle information acquirer 202, a controller 203, an information outputter 204, a receiver 205, and a transmitter 206. The vehicle position detector 201 detects current position information of the vehicle by using GPS etc., and sends the current position information to the controller 203. The vehicle information acquirer 202 acquires vehicle information about the vehicle in which the navigation device 200 is mounted, and sends the vehicle information to the controller 203. The vehicle information is various pieces of information about the vehicle, such as a vehicle speed, acceleration, and a traveling direction. The information outputter 204 is provided with, for example, a speaker and LEDs or a liquid crystal display (display screen), and presents information to the driver of the vehicle in which the navigation device 200 is mounted in response to a request from the controller 203. The receiver 205 and the transmitter 206 are engaged in processes using radio communications. The receiver 205 receives wireless data from communication devices for pedestrians or navigation devices each equipped with a communication device for pedestrians and other vehicle-mounted communication devices or other navigation devices each equipped with a vehicle-mounted communication device, and sends the wireless data to the controller 203. The transmitter 206 transmits data by radio in response to a request from the controller 203. The controller 203 determines the degree of risk of a collision between the vehicle and a pedestrian, etc. from the descriptions of transmission data from a communication device for pedestrians or a navigation device equipped with a communication device for pedestrians which is received by the receiver 205, the current position of the vehicle detected by the vehicle position detector 201, and the information acquired by the vehicle information acquirer 202 and including the speed and the traveling direction of the vehicle. When determining that there is a risk of collision, the controller provides the driver of the vehicle with information, such as information calling for attention, via the information outputter 204. The controller 203 also has a function of periodically acquiring information from the vehicle position detector 201 and the vehicle information acquirer 202, generating transmission data, and transmitting this data from the transmitter 206.

More specifically, the navigation device 100 equipped with the communication device for pedestrians is a general portable navigation device that provides route guidance on the basis of the pedestrian's position detected by the pedestrian position detector 101 detected and map data, and that includes the communication device for pedestrians 10 in accordance with Embodiment 1. Further, the navigation device 200 equipped with the vehicle-mounted communication device is a general vehicle-mounted navigation device that provide route guidance on the basis of the position of the vehicle detected by the vehicle position detector 201, and map data, and that includes the vehicle-mounted communication device 20 in accordance with Embodiment 1. Because processes carried out by the navigation devices (refer to flow charts shown in FIGS. 5 to 7) are the same as those shown in Embodiment 1, the illustration and explanation of the processes will be omitted hereafter.

Also in accordance with Embodiment 2 of the present invention, because data from a pedestrian belonging to a pedestrian group who can easily come within sight of the drivers of vehicles are transmitted to vehicle-mounted communication devices with a decreased frequency, lowered power, or a lowered priority while data from a pedestrian who cannot easily come within sight of the drivers of vehicles and does not belong to a pedestrian group are transmitted to vehicle-mounted communication devices with an increased frequency, raised power, or a raised priority, the navigation device equipped with the vehicle-mounted communication device can determine that a pedestrian who is easier to be overlooked has a high degree of risk and have the driver pay attention to the pedestrian, and hence can have the driver certainly recognize the existence of a pedestrian not belonging to a pedestrian group, like in the case of Embodiment 1. The navigation device equipped with the vehicle-mounted communication device can also have a pedestrian not belonging to a pedestrian group pay attention to the vehicle's approach, thereby being able to urge the pedestrian to pay a spontaneous attention to the vehicle and take evasive action, and therefore preventing the occurrence of a traffic accident.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

A vehicle-mounted communication device and a navigation device equipped with this vehicle-mounted communication device, a communication device for pedestrians and a navigation device equipped with this communication device for pedestrians, and a pedestrian-to-vehicle communication system in accordance with the present invention are suitable for use at locations where traffic accidents between vehicles and pedestrians happen easily.

EXPLANATIONS OF REFERENCE NUMERALS

1 vehicle, 2 pedestrian, 3 pedestrian group, 4 pedestrian not belonging to the pedestrian group 3, 10 communication device for pedestrians, 11 navigation device for pedestrians, 20 vehicle-mounted communication device, 21 vehicle-mounted navigation device, 100 navigation device equipped with communication device for pedestrians, 101 and 111 pedestrian position detector, 102 pedestrian information acquirer, 103 information processor, 104 information outputter, 105 receiver, 106 transmitter, 200 navigation device equipped with vehicle-mounted communication device, 201 and 211 vehicle position detector, 202 vehicle information acquirer, 203 controller, 204 information outputter, 205 receiver, 206 transmitter.

The invention claimed is:

1. A vehicle-mounted communication device that carries out radio communications with a communication device for pedestrians which is carried by a pedestrian, said vehicle-mounted communication device comprising:
    a receiver that receives pedestrian information showing whether said pedestrian belongs to a pedestrian group formed of said pedestrian and a plurality of pedestrians in a vicinity of said pedestrian from said communication device for pedestrians;
    a controller that judges said pedestrian information received by said receiver, and issues a command to present pedestrian attention information and also issues a command to transmit vehicle approach information showing that said vehicle is approaching when said pedestrian information shows that said pedestrian does not belong to a pedestrian group;
    an information outputter that presents said pedestrian attention information according to the command from said controller; and
    a transmitter that transmits said vehicle approach information to a communication device for pedestrians carried by a pedestrian not belonging to said pedestrian group according to the command from said controller.

2. The vehicle-mounted communication device according to claim 1, wherein said vehicle-mounted communication device further includes a vehicle position detector that detects a position of said vehicle, and wherein said receiver also receives a position of the pedestrian carrying said communication device for pedestrians, as well as said pedestrian information, from said communication device for pedestrians and said controller issues the command to present said pedestrian attention information when said pedestrian information shows that said pedestrian does not belong to a pedestrian group and a distance between said vehicle and said pedestrian, which said controller calculates on a basis of the position of the vehicle detected by said vehicle position detector and the position of the pedestrian received from said communication device for pedestrians, is equal to or less than a predetermined value.

3. The vehicle-mounted communication device according to claim 1, wherein said vehicle-mounted communication device further includes a vehicle position detector that detects a position of said vehicle and a vehicle information acquirer that acquires vehicle information including at least a vehicle speed, and wherein said receiver also receives a position of the pedestrian carrying said communication device for pedestrians, as well as said pedestrian information, from said communication device for pedestrians and said controller issues the command to present said pedestrian attention information when said pedestrian information shows that said pedestrian does not belong to a pedestrian group and a time required for said vehicle to reach said pedestrian, which said controller calculates on a basis of the position of the vehicle detected by said vehicle position detector, the position of the pedestrian received from said communication device for pedestrians, and the vehicle speed acquired by said vehicle information acquirer, is equal to or less than a predetermined value.

4. A navigation device that includes a vehicle position detector that detects a position of a vehicle and provides guidance on a basis of the position of the vehicle detected by said vehicle position detector and map data, said navigation device comprising said vehicle-mounted communication device according to claim 1.

5. A communication device for pedestrians that carries out radio communications with a vehicle-mounted communication device mounted in a vehicle, and that is carried by a pedestrian, said communication device for pedestrians comprising:
- a pedestrian information acquirer that acquires pedestrian information showing whether said pedestrian belongs to a pedestrian group formed of said pedestrian and a plurality of pedestrians in a vicinity of said pedestrian;
- an information processor that issues a command to transmit the pedestrian information acquired by said pedestrian information acquirer by using a transmission method of changing a transmission frequency, transmission power, or a transmission priority according to whether said pedestrian information belongs to a pedestrian group; and
- a transmitter that transmits said pedestrian information to said vehicle-mounted communication device in response to the command from said information processor.

6. The communication device for pedestrians according to claim 5, wherein said communication device for pedestrians further includes a receiver that receives vehicle approach information showing that said vehicle is approaching from said vehicle-mounted communication device, and an information outputter that presents said vehicle approach information received by said receiver.

7. The communication device for pedestrians according to claim 5, wherein said communication device for pedestrians further includes a pedestrian position detector that detects a position of said pedestrian, and a receiver that receives positions of other pedestrians transmitted from other communication devices for pedestrians respectively carried by the other pedestrians, and wherein when there exist a predetermined number or more of other communication devices for pedestrians whose positions, which are transmitted from said other communication devices, fall within a predetermined range at a certain distance from the position of said pedestrian detected by said pedestrian position detector, said information processor determines that said pedestrian belongs to a pedestrian group; otherwise, determines that said pedestrian does not belong to a pedestrian group, and generates said pedestrian information.

8. The communication device for pedestrians according to claim 5, wherein when said pedestrian information shows that the pedestrian carrying said communication device for pedestrians does not belong to a pedestrian group, said information processor issues the command to transmit said pedestrian information with the increased transmission frequency as the transmission method of transmitting said pedestrian information.

9. The communication device for pedestrians according to claim 5, wherein when said pedestrian information shows that the pedestrian carrying said communication device for pedestrians does not belong to a pedestrian group, said information processor issues the command to transmit said pedestrian information with the increased transmission power as the transmission method of transmitting said pedestrian information.

10. The communication device for pedestrians according to claim 5, wherein when said pedestrian information shows that the pedestrian carrying said communication device for pedestrians does not belong to a pedestrian group, said information processor issues the command to transmit said pedestrian information with the increased priority as the transmission method of transmitting said pedestrian information.

11. A navigation device that includes a pedestrian position detector that detects a position of a pedestrian and provides guidance on a basis of the position of the pedestrian acquired by said pedestrian position detector and map data, said navigation device comprising said communication device for pedestrians according to claim 5.

12. A pedestrian-to-vehicle communication system that includes a communication device for pedestrians carried by a pedestrian and a vehicle-mounted communication device mounted in a vehicle, and that carries out radio communications between said communication device for pedestrians and said vehicle-mounted communication device, wherein
said communication device for pedestrians comprises:
- a pedestrian information acquirer that acquires pedestrian information showing whether said pedestrian belongs to a pedestrian group formed of said pedestrian and a plurality of pedestrians in a vicinity of said pedestrian;
- an information processor that issues a command to transmit the pedestrian information acquired by said pedestrian information acquirer by using a transmission method of changing a transmission frequency, transmission power, or a transmission priority according to whether said pedestrian information belongs to a pedestrian group; and
- a transmitter that transmits said pedestrian information to said vehicle-mounted communication device in response to the command from said information processor, and wherein
said vehicle-mounted communication device comprises:
- a receiver that receives said pedestrian information transmitted from the transmitter of said communication device for pedestrians;
- a controller that judges said pedestrian information received by said receiver, and issues a command to present pedestrian attention information and also issues a command to transmit vehicle approach information showing that said vehicle is approaching when said pedestrian information shows that said pedestrian does not belong to a pedestrian group;
- an information outputter that presents said pedestrian attention information according to the command from said controller; and
- a transmitter that transmits said vehicle approach information to a communication device for pedestrians carried by a pedestrian not belonging to said pedestrian group according to the command from said controller.

13. The pedestrian-to-vehicle communication system according to claim 12, wherein said communication device for pedestrians further includes a receiver that receives said vehicle approach information transmitted from the transmitter of said vehicle-mounted communication device, and an information outputter that presents said vehicle approach information received by said receiver.

14. The pedestrian-to-vehicle communication system according to claim 12, wherein said communication device for pedestrians further includes a pedestrian position detector that detects a position of said pedestrian, and a receiver that receives positions of other pedestrians transmitted from other communication devices for pedestrians respectively carried by the other pedestrians, and wherein when there exist a predetermined number or more of other communication devices for pedestrians whose positions, which are transmitted from said other communication devices, fall within a predetermined range at a certain distance from the position of the pedestrian detected by said pedestrian position detector, said information processor determines that said pedestrian belongs to a pedestrian group; otherwise, determines that said pedestrian does not belong to a pedestrian group, and generates said pedestrian information.

15. The pedestrian-to-vehicle communication system according to claim 12, wherein when said pedestrian information shows that the pedestrian carrying said communication device for pedestrians does not belong to a pedestrian group, said information processor issues the command to transmit said pedestrian information with an increased transmission frequency as the transmission method of transmitting said pedestrian information.

16. The pedestrian-to-vehicle communication system according to claim 12, wherein when said pedestrian information shows that the pedestrian carrying said communication device for pedestrians does not belong to a pedestrian group, said information processor issues the command to transmit said pedestrian information with increased transmission power as the transmission method of transmitting said pedestrian information.

17. The pedestrian-to-vehicle communication system according to claim 12, wherein when said pedestrian information shows that the pedestrian carrying said communication device for pedestrians does not belong to a pedestrian group, said information processor issues the command to transmit said pedestrian information with an increased priority as the transmission method of transmitting said pedestrian information.

18. The pedestrian-to-vehicle communication system according to claim 12, wherein said communication device for pedestrians further includes a pedestrian position detector that detects a position of said pedestrian and the transmitter of said communication device for pedestrians also transmits the position of the pedestrian detected by said pedestrian position detector when transmitting said pedestrian information, and wherein said vehicle-mounted communication device further includes a vehicle position detector that detects a position of said vehicle, the receiver of said vehicle-mounted communication device also receives the position of the pedestrian carrying said communication device for pedestrians, as well as said pedestrian information, from said communication device for pedestrians, and said controller issues the command to present said pedestrian attention information when said pedestrian information shows that said pedestrian does not belong to a pedestrian group and a distance between said vehicle and said pedestrian, which said controller calculates on a basis of the position of the vehicle detected by said vehicle position detector and the position of the pedestrian received from said communication device for pedestrians, is equal to or less than a predetermined value.

19. The pedestrian-to-vehicle communication system according to claim 12, wherein said communication device for pedestrians further includes a pedestrian position detector that detects a position of said pedestrian and the transmitter of said communication device for pedestrians also transmits the position of the pedestrian detected by said pedestrian position detector when transmitting said pedestrian information, and wherein said vehicle-mounted communication device further includes a vehicle position detector that detects a position of said vehicle and a vehicle information acquirer that acquires vehicle information including at least a vehicle speed, said receiver also receives the position of the pedestrian carrying said communication device for pedestrians, as well as said pedestrian information, from said communication device for pedestrians, and said controller issues the command to present said pedestrian attention information when said pedestrian information shows that said pedestrian does not belong to a pedestrian group and a time required for said vehicle to reach said pedestrian, which said controller calculates on a basis of the position of the vehicle detected by said vehicle position detector, the position of the pedestrian received from said communication device for pedestrians, and the vehicle speed acquired by said vehicle information acquirer, is equal to or less than a predetermined value.

* * * * *